United States Patent [19]

Regenbrecht

[11] 4,268,195
[45] May 19, 1981

[54] APPARATUS FOR MAKING HOLES IN ARM SECTIONS OF STRUCTURAL COMPONENTS

[75] Inventor: Ludwig Regenbrecht, Gevelsberg, Fed. Rep. of Germany

[73] Assignee: Rolf Peddinghaus, Ennepetal, Fed. Rep. of Germany

[21] Appl. No.: 104,074

[22] Filed: Dec. 17, 1979

[51] Int. Cl.³ .................... B23B 49/00; B26D 5/00; B26D 7/27

[52] U.S. Cl. ........................ 408/16; 83/368; 83/522

[58] Field of Search ............ 408/16; 83/368, 522, 83/527, 560

[56] References Cited

U.S. PATENT DOCUMENTS

| 2,988,934 | 6/1961 | Shlager | 408/16 |
|---|---|---|---|
| 3,120,135 | 2/1964 | Henderson | 408/16 |
| 3,817,135 | 6/1974 | Valente | 83/368 |
| 3,836,276 | 9/1974 | Cloup | 408/16 |
| 3,858,471 | 1/1975 | Valente | 83/368 |
| 3,977,804 | 8/1976 | Kitagawa | 408/16 |
| 4,040,320 | 8/1977 | Cloup | 83/368 |

*Primary Examiner*—Harrison L. Hinson
*Attorney, Agent, or Firm*—Dressler, Goldsmith, Shore, Sutker & Milnamow, Ltd.

[57] ABSTRACT

Apparatus for making holes in arm sections of structural components which employs a vertically movable sensor and indicator device for aligning a perforating device for making a hole in a section of the structural component. The sensor and indicating device provides for precise alignment of the perforating device and includes a gauge and index device attached to the perforating device.

5 Claims, 10 Drawing Figures

APPARATUS FOR MAKING HOLES IN ARM SECTIONS OF STRUCTURAL COMPONENTS

The invention relates to an apparatus according to the introductory definition of Patent Claim 1, the structural components being e.g., I-shaped or U-shaped girders, angle profiles etc.

The increasing use of profile elements as structural material has had the consequence that prefabricated subassemblies are produced initially before the structural components are brought into the correct position on a building etc., and secured to the latter. The prefabrication of such subassemblies can be performed either on the manufacturer's factory site or at ground level on the building site before the subassembly is hoisted into the correct position. Due to the tolerances which occur in the prefabrication, every structural component used for this purpose must be checked for correct dimensional tolerances, particularly for the correct location of holes to receive screws, rivets etc.

An apparatus for making holes in arm sections of structural components conforming to the introductory definition of Patent Claim 1 is known from U.S. Pat. No. 3,817,135 and U.S. Pat. No. 3,858,471, by means of which the holes, in the case of I-shaped girders, are made in the flange at an interval from a horizontal plane or line bisecting the web, and when perforating the arm or arms of a U-shaped girder or of an angle profile, are made at an interval from the underside of the horizontal web or arm. The apparatus automatically positions the perforating tool at the desired height of the flange or arm by using two diametrally opposite movable sensing rams which grip the two sides of the web etc., of the structural component and sense the relative vertical position of the web. As soon as the correct reference vertical position has been detected, the perforating tool is moved into position above or below the web etc., and the hole is made. Although with this known apparatus it is possible to achieve a comparatively rapid and simple sensing of a reference section of the structural component and an automatic positioning of a perforating tool with reference to said reference section and the making of a hole in the relevant arm section, nevertheless the structural outlay to achieve this aim is comparatively great and consequently expensive.

It is therefore the underlying aim of the invention to improve the apparatus of the initially defined known category so that an accurate sensing of the web of profiled structural components is possible manually by extremely simple constructive means.

The invention achieves this aim by the characterising features of Patent Claim 1.

By this means it is achieved that the sensing pin with the gauge attached thereto needs only to be lowered onto the top side of the web of the structural component, whereupon the perforating device has to be moved with its index to the zero position of the gauge and the gauge must then be lowered until the index indicates half the web thickness in the case of an I-shaped structural component and the total web thickness in the case of U-shaped and L-shaped structural components, on the measurement scale of the gauge and then the perforating device has to be brought back with its index onto the zero position of the measurement scale, whereby the median longitudinal axis of the tool of the perforating device is located at the height of the web centre of an I-shaped structural component. The height of the hole axis of a hole to be made can now be adjusted and/or read off immediately on the measurement scale with the aid of the index of the perforating device.

By the features of Patent Claim 2, a considerably easier and simpler operation of the apparatus according to the invention can be achieved for the case of processing I-shaped structural components due to the scale 1:2 of the measurement scale on the second gauge, because the second measurement scale considerably facilitates the adjustment and reading off of the half web thickness.

In case I-shaped girders with a comparatively thick web are being processed, e.g., of 4", it is recommended according to Patent Claim 4 to construct the piston stroke of the sensor element correspondingly to half the web thickness, i.e., e.g., with a stroke height of 2" in the present case, so that by using the further development of the apparatus according to the invention according to Claim 3 an immediate adjustment of the sensor element to the web centre is possible.

The invention is illustrated in exemplary manner and schematically in the accompanying drawing, wherein.

Figure 1:
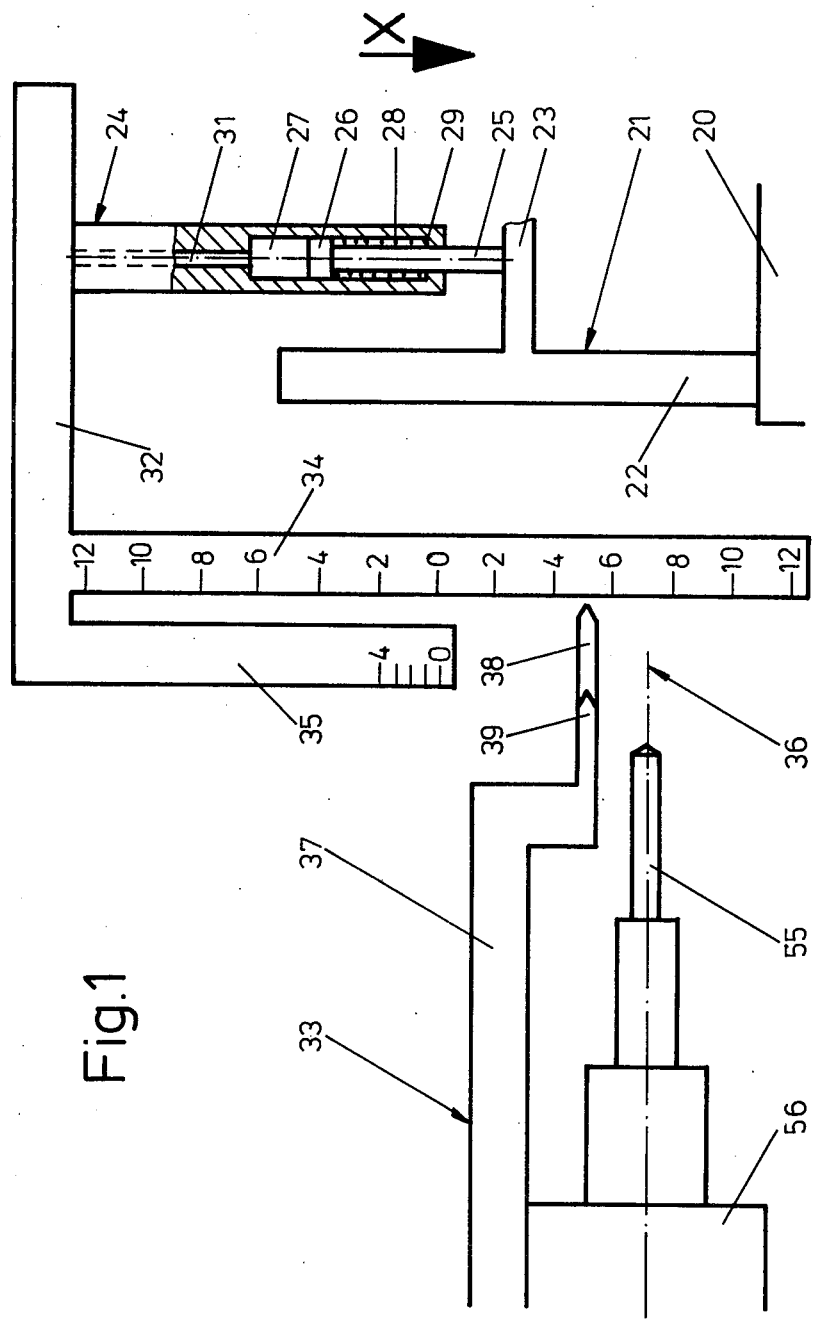
FIGS. 1 to 4 show work phases of the apparatus according to the invention during the sensing of the web of an I-shaped girder.

FIG. 1 shows the upper side of a rollerway 20 which simultaneously constitutes a reference plane for the apparatus. 21 designates an I-shaped structural component which rests by its two arms, of which only the arm 22 is shown, on the rollerway 20. A sensing element 24 with a sensor pin 25 is braced on the top side of its web 23. The upper end of the sensor pin 25 is guided as a piston 26 vertically slidingly in a cylinder 27. The underside of the piston is loaded by a compression spring 28, which in the annular space formed by the cylinder 27 and the piston rod 30 abuts by its lower end against an inner annular shoulder 29 of the cylinder 27. The cylinder chamber above the piston 26 is loadable through an axial bore 31 with a pressurised medium, preferably hydraulic fluid, counter to the action of the compression spring 28. The sensor element 24 is connected at the upper end to a horizontal beam 32 which extends transversely to the longitudinal direction of the I-shaped structural component 21 in the direction of a perforating device 33 and exhibits at its end a first gauge 34 and a second gauge 35, which extend vertically parallel to the sensor element 24 and at a mutual interval.

The perforating device is constituted by a horizontally arranged drilling unit 56 with a drilling tool 55, the median longitudinal axis of which is designated 36. Connected to the drilling unit is a yoke 37 which extends at an interval horizontally to the drilling axis 36 and terminates at its end in two indices 38, 39 which are arranged mutually staggered in the same horizontal plane so that the index 38 is associated with the gauge 34 and the index 39 with the gauge 35. As may be seen, the scale 35 of the gauge exhibits a scale of 1:2 compared to the scale 1:1 of the gauge 34.

Figure 2:
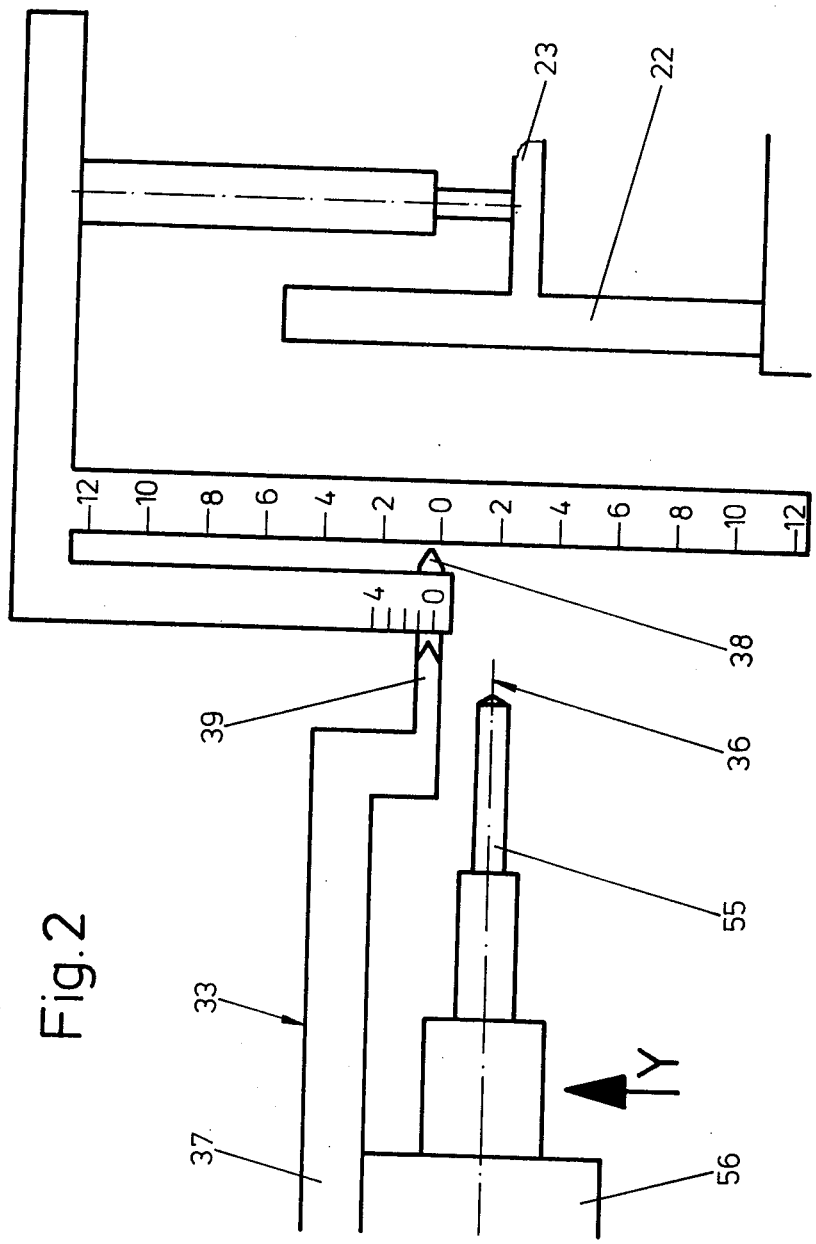
Figure 3:
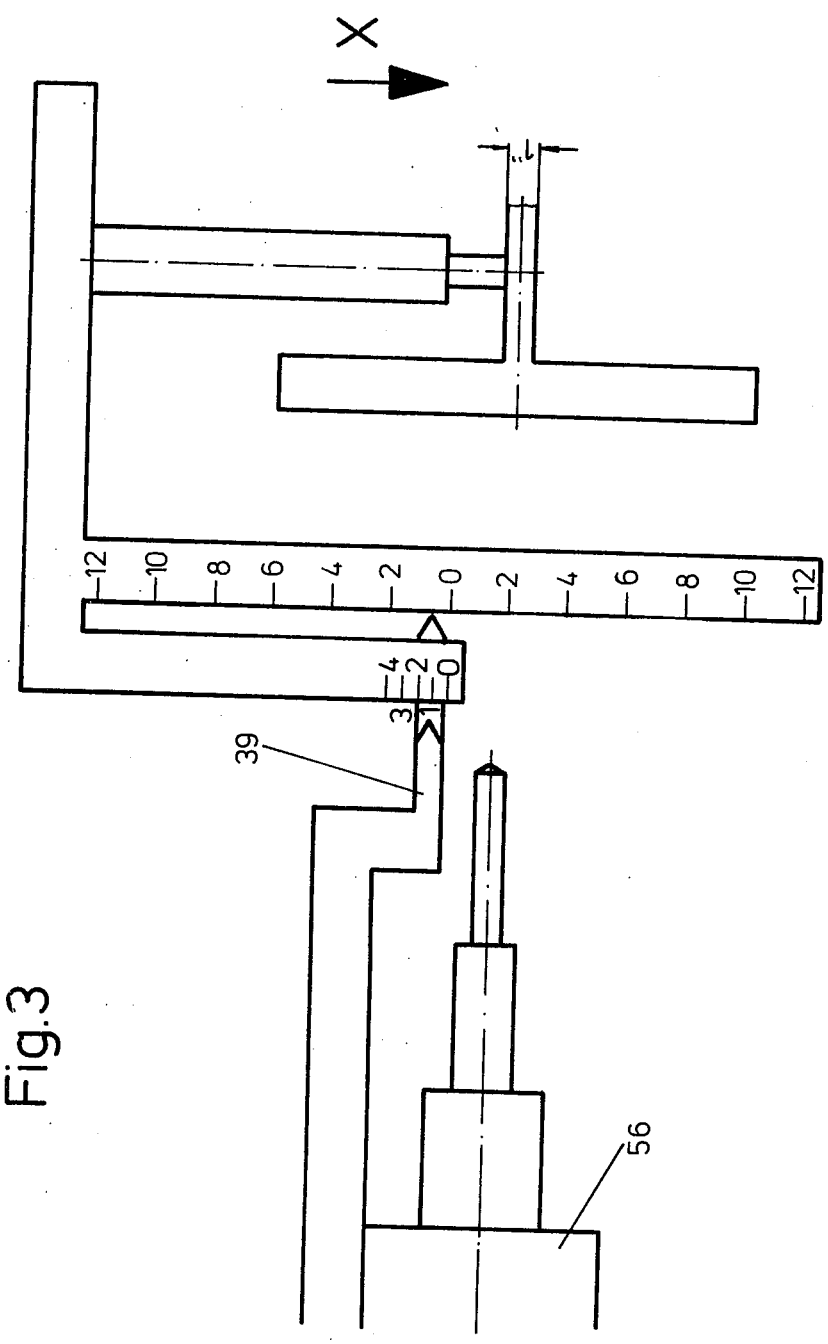
Figure 4:
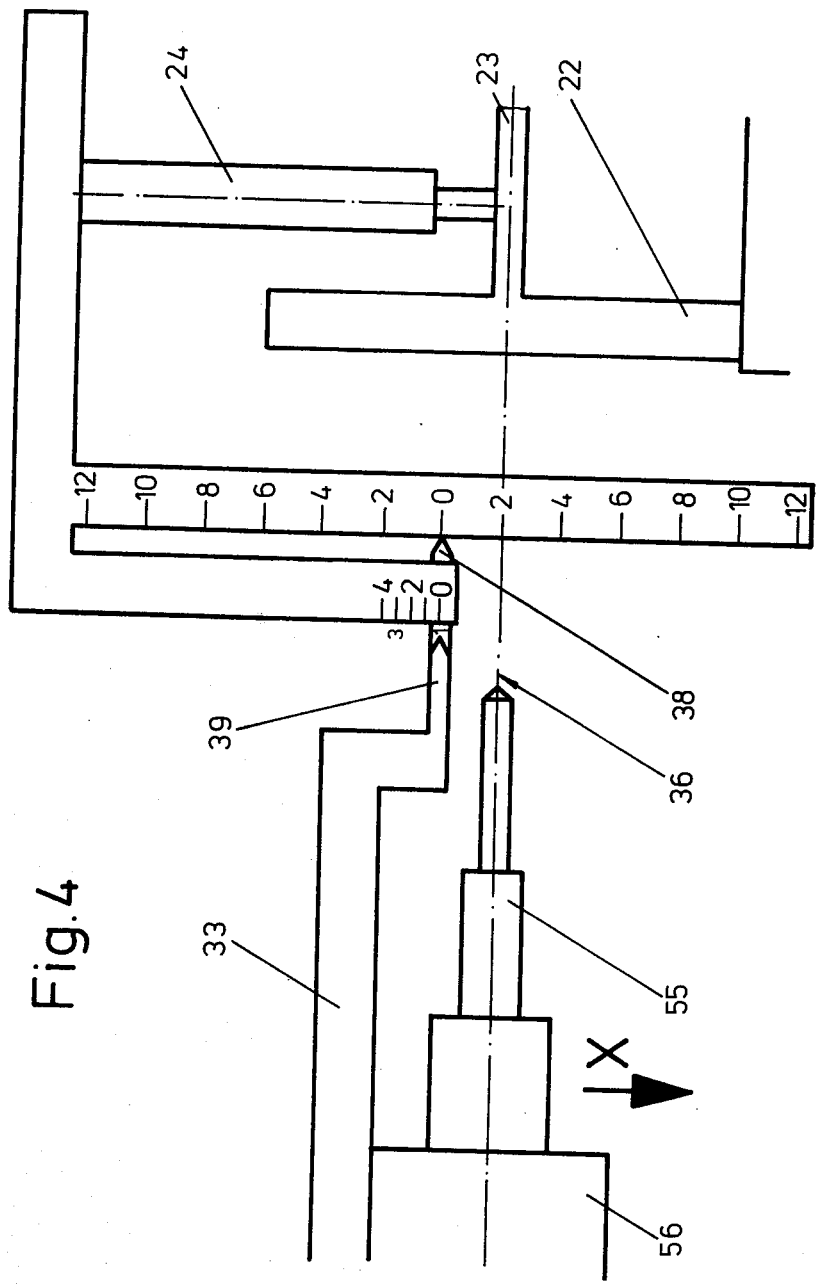
Figure 5:
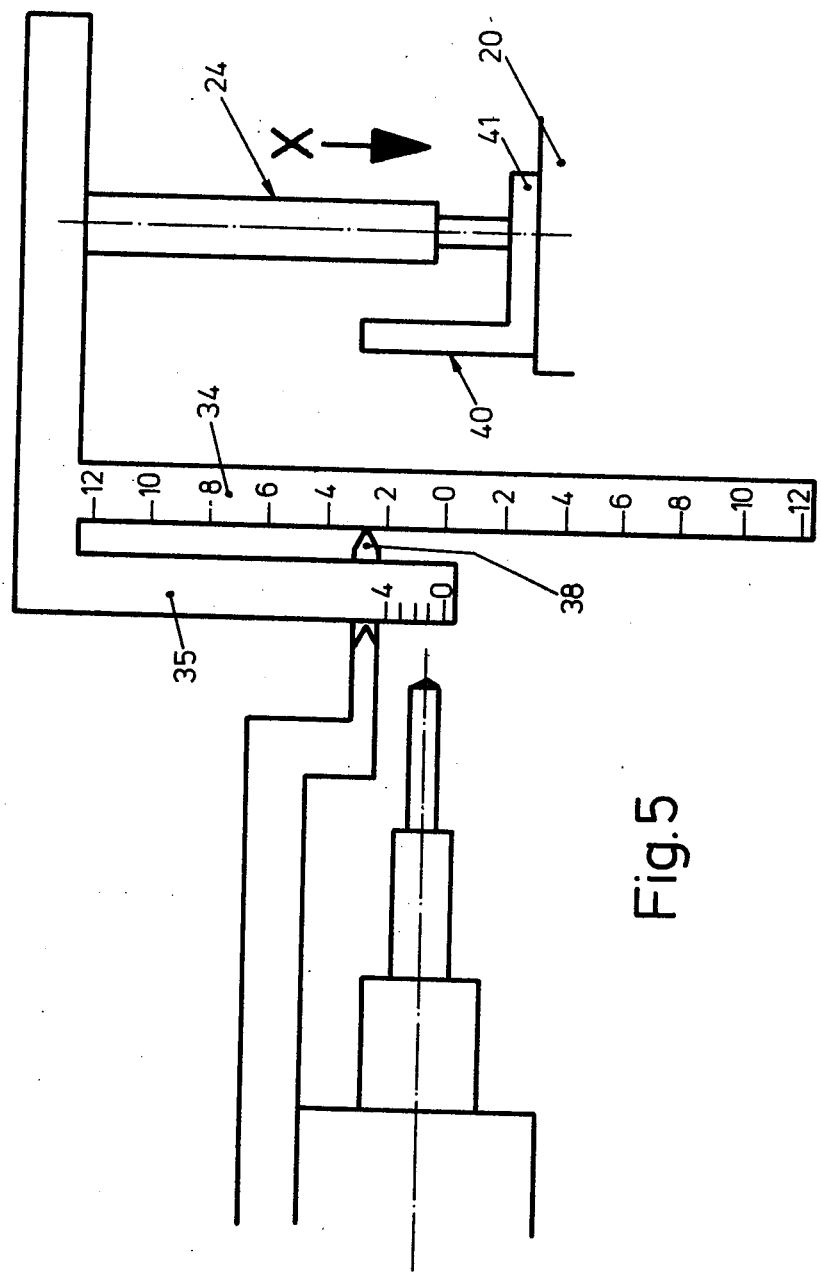
FIGS. 5 to 8 show four work phases of the apparatus according to the invention during the sensing of an angle profile.
Figure 6:
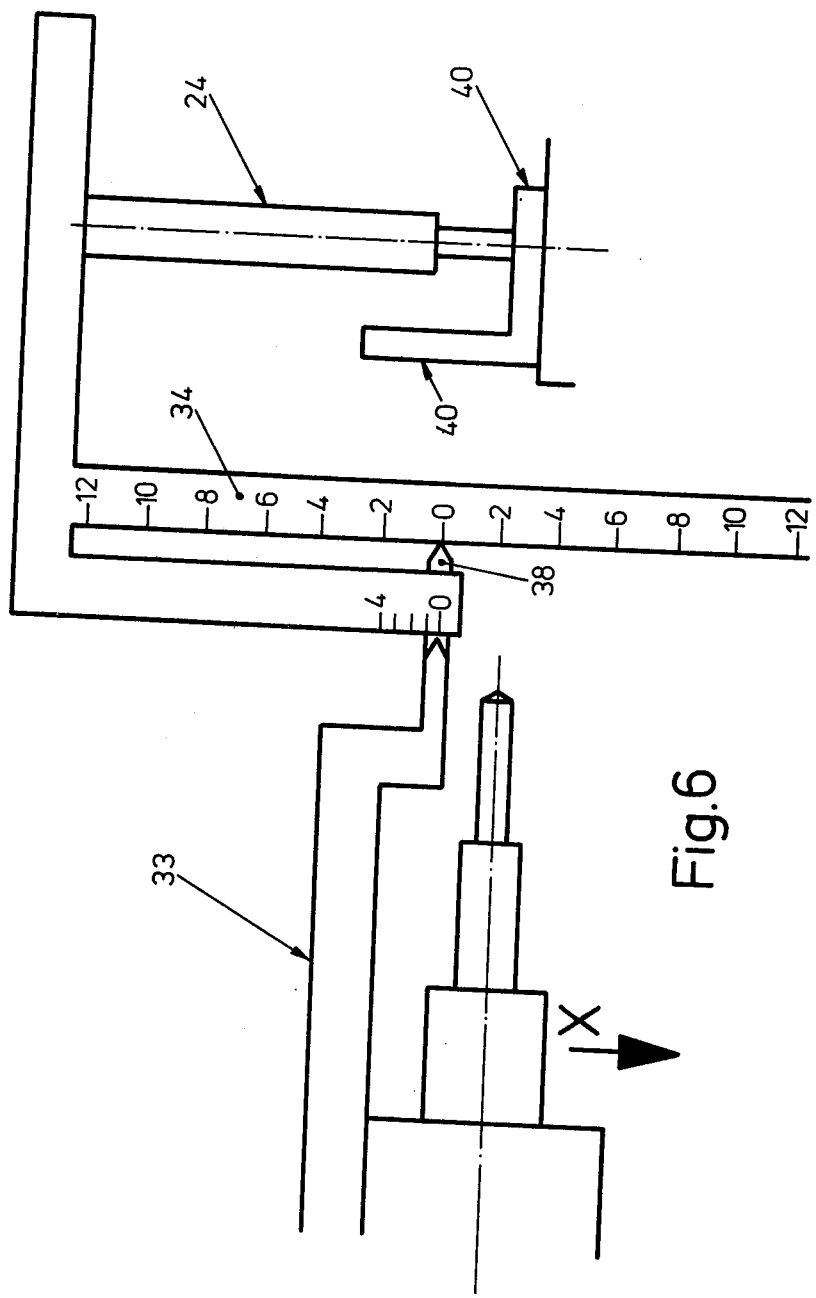
Figure 7:
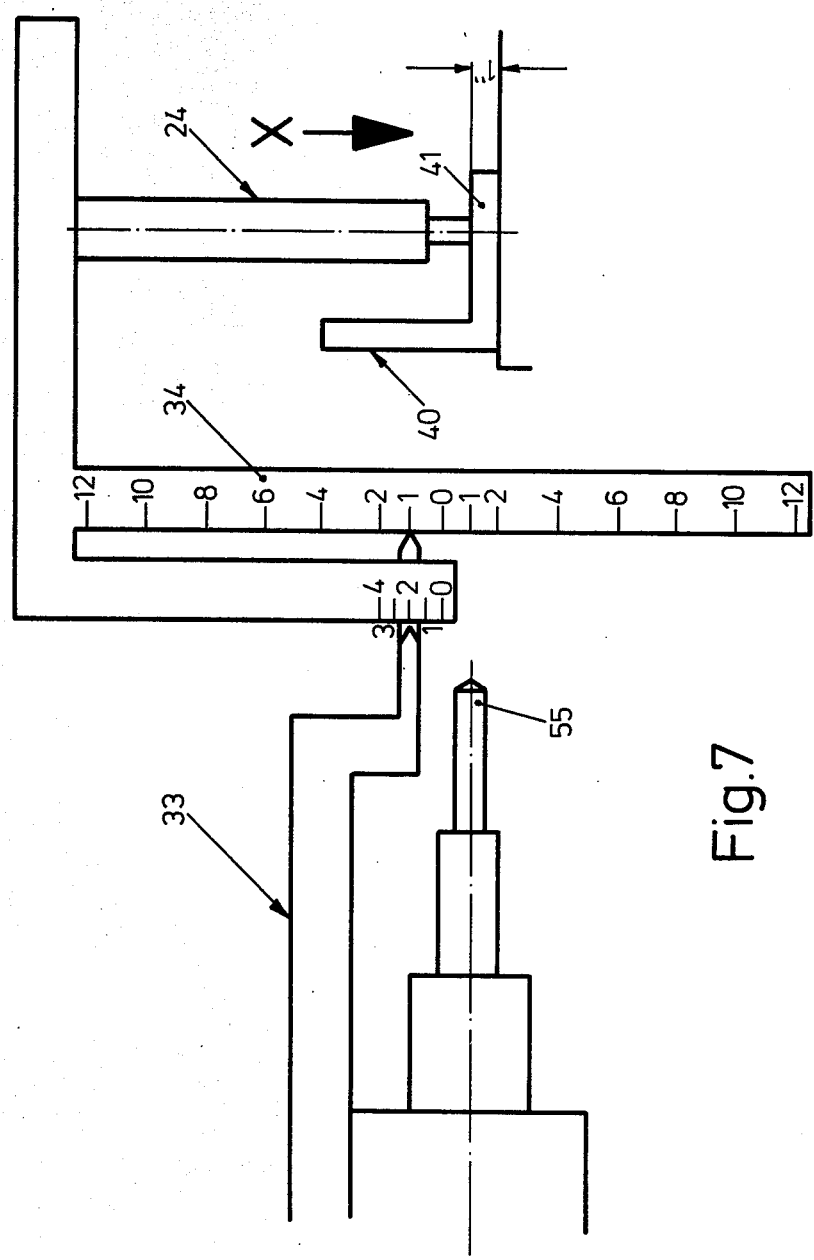
Figure 8:
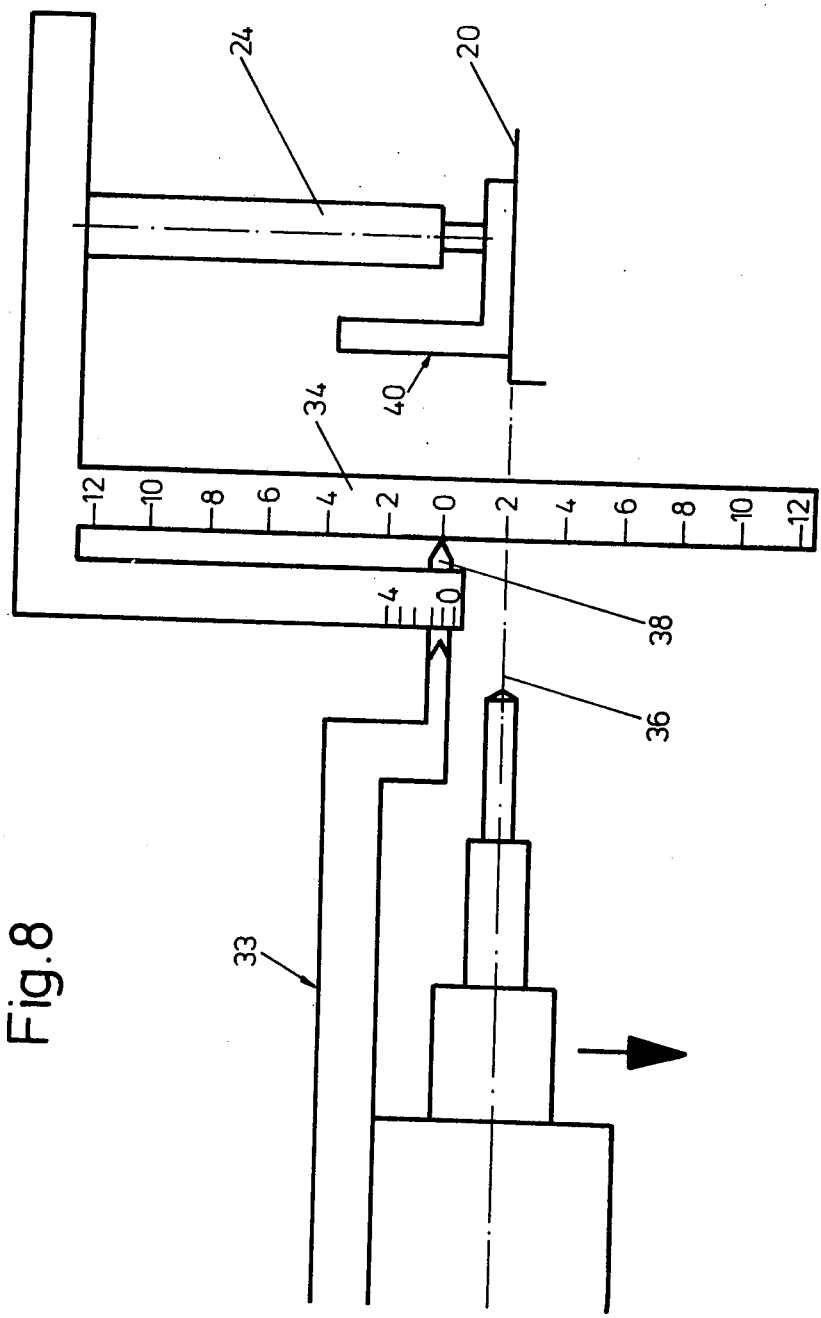

In order to sense the web centre of the web 23 of the I-shaped structural component 21, first of all the sensor element 24 is moved downwards in the direction of the arrow x with the sensing pin 25 hydraulically extended until contact of the sensor pin 25 with the top side of the web 23. The scale of the gauge 34 then assumes a position in which in FIG. 1 the arrow 38 of the perforating device 33 points to any value—e.g., to 5 of the measurement scale. The perforating device 33 is then moved upwards in the direction of the arrow y until the arrows 38, 39 respectively point to zero on the measurement scales of the gauges 34 and 35 (FIG. 2).

The sensor element 34 is thereupon again moved downwards in the direction of the arrow x until the arrow 39 points to number 1 of the gauge 35—i.e., half the web thickness in case the web of the I-shaped structural component equals one inch. Then the perforating device 33 is adjusted in the direction of the arrow x with the arrow 39 to zero of the scale of the gauge 35, which corresponds to the zero position of the arrow 38 on the scale 34, so that the drilling axis 36 is located at the height of the centre of the web 23 of the I-shaped girder. The exact positioning of the drill 55 with reference to the flange 22 of the workpiece can now be read off and adjusted accurately on the scale 34.

FIGS. 5 to 8 illustrate the adjustment of the drilling axis to the reference plane of an angle iron 40, the horizontal arm 41 of which rests upon the rollerway 20 and its underside thus constitutes the reference plane. According to FIG. 5 the sensor element 24 with extended sensor pin 25 is lowered onto the top edge of the horizontal arm 41 of the angle iron 40, whilst the index 38 indicates e.g., a position between 2 and 4 of the gauge 34. It is therefore necessary, according to FIG. 6, to lower the perforating device 33 in the direction of the arrow x until the arrow 38 indicates zero on the gauge 34. Then the sensor element 24 with the gauge 34 is lowered in the direction of the arrow x until the index 38 points to one on the gauge 34, which corresponds in the present case to the thickness of 1" of the horizontal arm 41 of the angle iron 40. If the perforating device 33 is then brought in the direction of the arrow x with the index 38 in the zero position of the gauge 34, then the drilling axis 36 is located at the height of the rollerway 20 or of the underside of the arm 41 of the angle iron 45 and hence at the height of the reference plane, so that the hole axis for the hole to be drilled can now be adjusted on the scale 34 with the aid of the index 38 by moving the perforating device 33, and the hole can be drilled.

Figure 9:
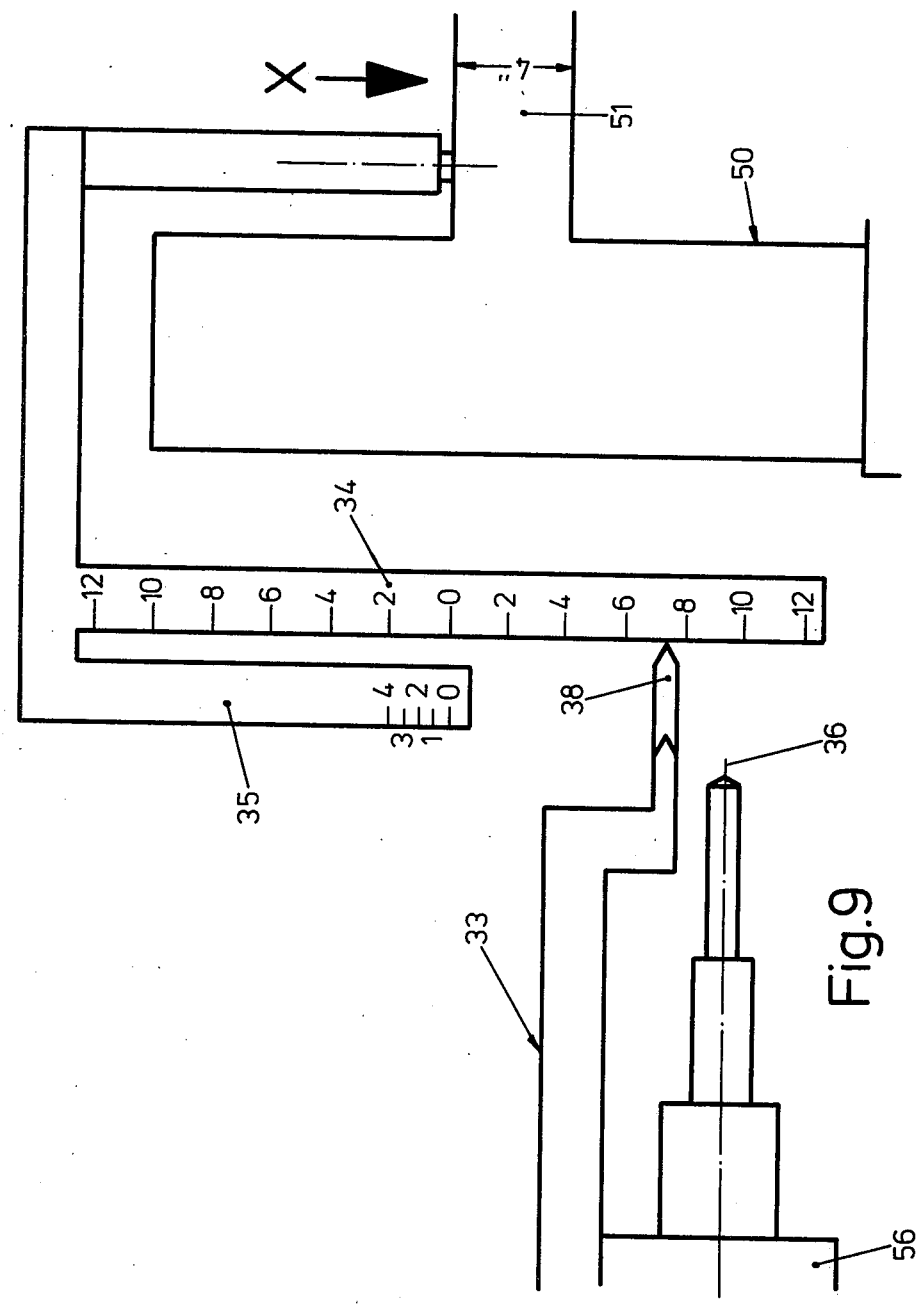
FIGS. 9 and 10 show two work phases of the apparatus according to the invention during the sensing of an I-shaped girder, the web thickness of which corresponds to twice the stroke of the sensing pin of the sensor element.
Figure 10:
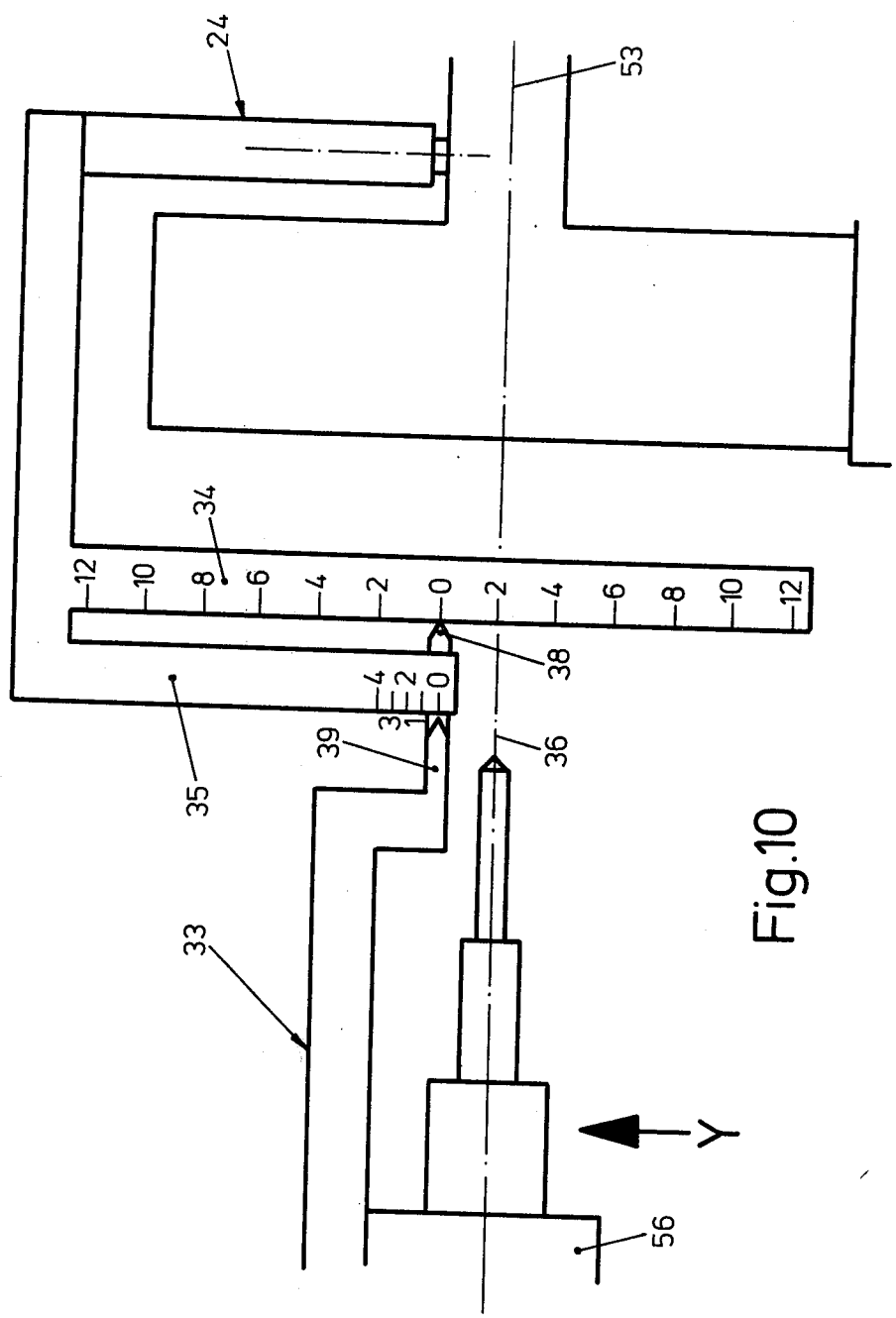

FIGS. 9 and 10 illustrate the sensing of an I-shaped girder 50, the web 51 of which exhibits a thickness of 4". The peculiarity lies in the fact that the stroke of the sensor pin 25 is dimensioned so that it corresponds to half the thickness of the web 51, i.e., 2". The functioning of the apparatus is accordingly such that the sensor element 24 with its sensor pin 25 retracted under the influence of the compression spring 28 into the cylinder 27 up to contact of the piston 26 after a stroke of 2" with the upper end of the cylinder, is lowered onto the web 51 according to FIG. 9. Then, according to FIG. 10, the perforating device is raised with the index 38 into the zero position of the gauge 34, whereby the drilling axis 36 is automatically located at the height of the web centre 53.

Although the embodiment described is preferred, it is optionally possible to use only the gauge 34 with the one index 38 and to provide the range between 0 and 2 of the measurement scale additionally with the measurement scale to the scale 1:2. Although this embodiment is simpler in construction, it can lead more easily to operating errors by the operator.

We claim:

1. Apparatus for making holes in arm sections of structural components which are transportable by a conveyor device which constitutes a reference plane for a web section of a structural component, with reference to the top side of which a sensor element of a sensing device is vertically movable which is connected to an indicator device for the indication of an interval, if any, existing between the web section of the structural component and the reference plane, whilst a perforating device for making a hole in an arm section of the structural component is movable into a desired relative position to the indicator device and is precisely alignable with reference to the web section in proximity of the arm section of the structural component, characterised in that a vertical gauge (34) of the indicator device is firmly connected to the sensing device and extends parallel at an interval beside the latter, and that there is associated with the gauge (34) an index (38) which is attached to the perforating device at a specific interval from and parallel to its tool axis (36).

2. Apparatus according to claim 1, characterised in that an additional measurement scale with the scale 1:2 is associated with the gauge (34) and serves exclusively for adjusting the centre of the web (23) of an I-shaped structural component (21).

3. Apparatus according to claim 2, characterised in that the additional measurement scale on the scale 1:2 is provided on a second gauge (35) which extends at an interval parallel to the first gauge (34) with the scale 1:1 and with which a second index (39) is associated which is connected to the perforating device (33) in the same manner as the first index (38), but staggered horizontally with reference to the latter.

4. Apparatus according to claim 2, characterised in that the sensing device (24) exhibits a sensor pin (2), the top end of which is guided vertically as a piston (26) in a pressurised medium cylinder (27), whilst the top free piston end is loaded by a pressurised medium, whereas the lower piston end confronting the sensor pin (25) is subject to the influence of a compression spring (28).

5. Apparatus according to claim 4, characterised in that the piston stroke of the sensor pin (25) corresponds to half the thickness of the web (51) and the perforating device (33) is adjusted to the web centre in the extended position of the sensor pin (25) out of the cylinder (27).

* * * * *